United States Patent [19]

Chesler et al.

[11] Patent Number: 5,039,218

[45] Date of Patent: Aug. 13, 1991

[54] TESTING OF OPTICAL FIBER BY INTRODUCING MULTIPLE SIMULATED PEEL LOCATION BENDS

[75] Inventors: Ronald B. Chesler, Woodland Hills, Calif.; George W. Lecompte, Tucson, Ariz.; Vincent L. Jones, Simi Valley, Calif.

[73] Assignee: Hughes Aircraft Company, Los Angeles, Calif.

[21] Appl. No.: 500,623

[22] Filed: Mar. 28, 1990

[51] Int. Cl.⁵ ...................... G01N 21/88; G01N 21/89
[52] U.S. Cl. .................................................. 356/73.1
[58] Field of Search ........................................ 356/73.1

[56] References Cited

U.S. PATENT DOCUMENTS 4,957,364 9/1990 Chesler .............................. 356/73.1

*Primary Examiner*—Vincent P. McGraw
*Attorney, Agent, or Firm*—C. D. Brown; R. M. Heald; W. K. Denson-Low

[57] ABSTRACT

The optical characteristics of an optical fiber (28) are studied by simultaneously introducing multiple small-radius bends into a short length of the optical fiber (28). Since there is a small loss of light associated with each bend, those losses are added and made easier to measure and analyze when multiple bends are used. The optical fiber (28) is wound over a mandrel (10, 50) that is shaped to include at least two simulated peel location bends of the optical fiber (28) wound onto the mandrel (10, 50), and, preferably, four or more simulated peel location bends per turn of optical fiber (28) around the mandrel (10, 50).

21 Claims, 3 Drawing Sheets

TESTING OF OPTICAL FIBER BY INTRODUCING MULTIPLE SIMULATED PEEL LOCATION BENDS

BACKGROUND OF THE INVENTION

This invention relates to the testing of optical fibers, and more particularly, to bend testing of such fibers.

Optical fibers are strands of glass fiber processed so that light transmitted therethrough is subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are fabricated by preparing a preform of glasses of two different optical indices of refraction, one inside the other, and processing the preform to a fiber. The optical fiber is coated with a polymer layer termed a buffer to protect the glass from scratching and other types of damage. As an example of the dimensions, in one configuration the diameter of the glass optical fiber is about 125 micrometers, and the diameter of the fiber plus the polymer buffer is about 250 micrometers (approximately 0.010 inches).

For such very fine fibers, the handling of the optical fiber to avoid damage that might reduce its light transmission properties becomes an important consideration. The fibers may be wound onto a cylindrical or tapered cylindrical bobbin with many turns adjacent to each other in a side by side fashion. After one layer is complete, another layer of fiber is laid on top of the first layer, and so on. The final assembly of the bobbin and the wound layers of fiber is termed a canister, and the mass of wound fiber is termed the fiber pack. When the optical fiber is later to be used, the fiber is paid out from the canister in a direction parallel to the axis of the cylinder.

It has been found by experience that, where the fiber is to be paid out from the canister in a rapid fashion, as for example over a hundred meters per second, the turns of optical fiber must be held in place on the canister with an adhesive. The adhesive holds each turn of fiber in place on the fiber pack as adjacent turns and layers are initially wound onto the canister, and also as adjacent turns and layers are paid out. Without the use of an adhesive, payout of the fibers may not be uniform and regular, leading to snarls or snags of the fibers that damage them or cause them to break as they are paid out.

When the optical fiber is paid out from the canister in a direction parallel to the cylindrical axis of the canister, the optical fiber is bent through an angle, called the peel angle, with a relatively small bend radius as it is pulled away from the fiber pack to which it is adhesively bonded. The peel angle may vary depending upon the peel tension and the geometry of the peeling, but is typically about 30-60 degrees. It is known that bending of the fiber, such as that experienced during payout, reduces the transmission of light through the fiber, and can cause it to fail mechanically.

The processing of optical fibers has progressed to the point that the loss of light energy resulting from a peel bend can be as small as 0.1 decibel (db) or less. It is important to measure such small energy losses in order to fully characterize the fiber, but such measurements can be difficult due to a variety of effects. There is a need for an approach to the testing of optical fibers that permits small bend losses of the optical fibers to be reliably measured. The present invention fulfills this need, and further provides related advantages.

SUMMARY OF THE INVENTION

The present invention provides a testing procedure that permits optical loss from bends of small radius to be measured more reliably and accurately than has heretofore been possible. The process is implemented using existing light measurement apparatus, and a specialized testing fixture. The method is reliable and easily used.

In accordance with the invention, a process for testing an optical fiber comprises the steps of providing a bending mandrel having at least two simulated peel point bending locations disposed such that an optical fiber wound around the mandrel passes over the bending locations, each peel point bending location bending the optical fiber in a manner simulating the bending that an optical fiber undergoes when paid out from a fiber canister; and winding the optical fiber over the bending mandrel, thereby simultaneously applying multiple simulated peel point bends to the length of the optical fiber in contact with the mandrel. In the preferred approach, the process is used in conjunction with light transmission measurement apparatus to determine the light loss due to a single bend in the optical fiber.

The design of the bending mandrel is selected so that the optical fiber is bent through an angle that simulates the peel angle at which the optical fiber is paid out from the canister, at each of several locations. That angle is typically about 30-60 degrees. In one design of bending mandrel, the mandrel is formed by machining flat surfaces on each side of a cylindrical rod, each flat surface being perpendicular to the same cylindrical diameter. By selecting a particular depth of the material removed to form the flat surfaces, the angle between the curved face and the flat face is determined to simulate the peel angle. It has been determined empirically that a distance between the flat faces of about $\frac{1}{2}$ the cylindrical diameter produces four simulated peel bends of about 30 degrees each and four simulated peel bends of about 60 degrees each, per turn of optical fiber around the mandrel.

With this design of bending mandrel, each turn of the optical fiber around the portion having flat surface produces eight simulated peel point bending locations within a length of optical fiber of less than four inches. A second turn produces another eight simulated peel point bending locations, and so on. With the application of the proper tension to the free ends of the optical fiber, the 30 and 60 degree peel behavior is well simulated, so that the optical loss per peel bend may be more readily measured.

Another design of bending mandrel has an equilateral triangular prism section configuration about which the optical fiber is wound. Each turn of the optical fiber about the mandrel produces six simulated 60 degree peel point bends because of the equilateral triangular design of the mandrel. The equilateral triangular prism mandrel produces two precisely equal peel configurations at each corner, and the high degree of symmetry coupled with the three point contact simplify calculation of the exact curvature of the optical fiber.

After it is wound around the mandrel with a precisely applied fiber tension, the optical fiber may be tested for optical, mechanical, or other types of properties. In the test presently of most interest, an optical signal is introduced into the optical fiber on one side of the portion wound around the mandrel, passed through the portion of the optical fiber that is wound around the mandrel, and received on the other side of the portion wound around the mandrel. The attenuation of the signal due to the multiple simulated peel point bends is determined, and the attenuation divided by the number of simulated peel point bends to obtain the attenuation per bend. This determination achieves greater accuracy than possible by measurement of only a single peel point bending location.

The approach of the invention also extends to an apparatus useful in performing the optical testing of the optical fiber. In accordance with this aspect of the invention, apparatus for testing optical transmission of an optical fiber comprises a bending mandrel having at least two simulated peel point bending locations thereon; and means for sending a beam of light through an length of an optical fiber wound over the bending mandrel, for receiving that portion of the beam of light transmitted through the length of the optical fiber wound over the bending mandrel, and for comparing the intensities of the light received and the light sent. The apparatus also preferably includes means for applying a tension to the optical fiber, and further means for ensuring that the tension applied to the optical fiber is substantially the same at each of the bending locations.

The present invention provides an advance in the art of testing an optical fiber to be dispensed from canisters or the like. It allows careful testing of properties of the optical fiber in payout configuration, without the necessity for developing measurement techniques to be used during rapid payout. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with one preferred embodiment of the invention, a process for testing an optical fiber comprises the steps of providing a bending mandrel formed from a cylinder having two flat surfaces therein perpendicular to a cylindrical diameter; and winding an optical fiber around the bending mandrel.

Figure 1:
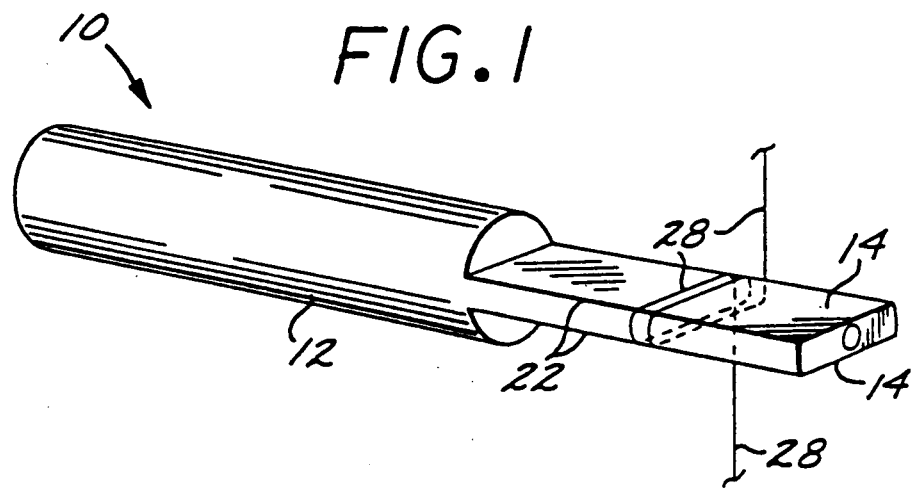
FIG. 1 is a perspective view of one bending mandrel of the invention, with two turns of optical fiber thereon.
Figure 2:
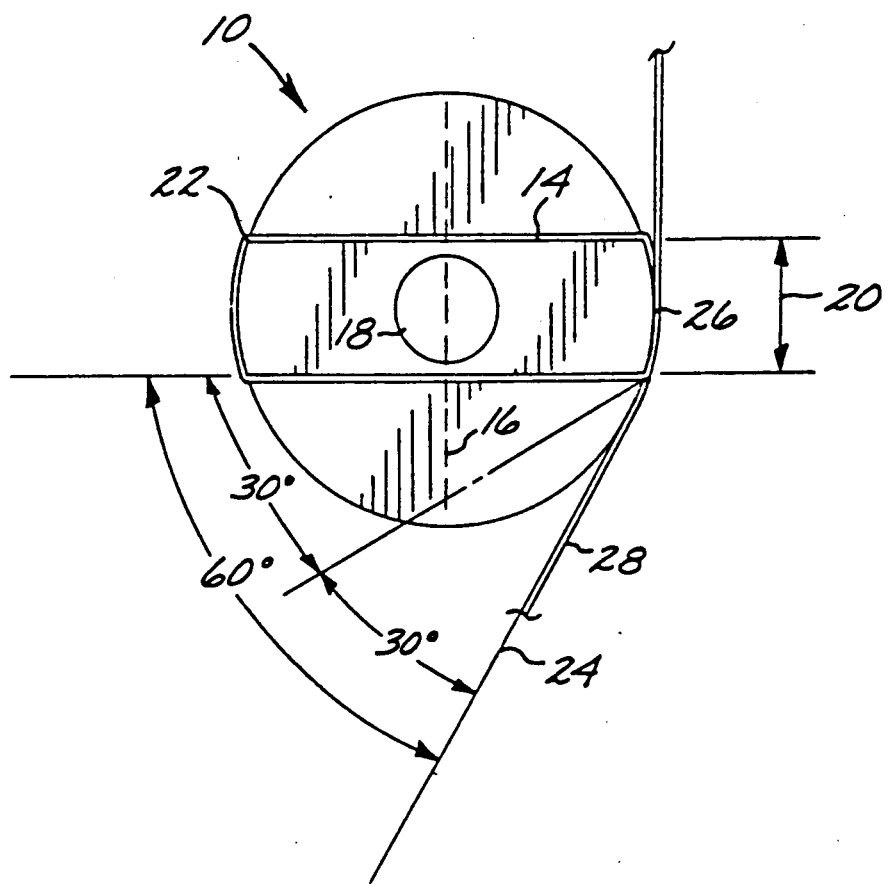
FIG. 2 is an end elevational view of the bending mandrel of FIG. 1.

Referring to FIG. 1, a bending mandrel 10 is formed from a cylindrical piece 12. One end of the piece 12 is left cylindrical. At the other end, two flat surfaces 14 are machined into the cylinder. As shown in FIG. 2, the flat surfaces 14 lie perpendicular to, and at the opposite ends of what was, before machining, a cylindrical diameter 16. The flat surfaces 14 are symmetrical in the sense that they lie the same distance from a cylindrical axis 18 of the mandrel 10.

In the preferred embodiment, the piece 12 is stainless steel cylindrical stock, having a diameter of about 1 inch and a length of about 2 inches. The flat surfaces 14 are about 1 inch long in the direction parallel to the cylindrical axis 18. The distance 20 between the flat surfaces 14 is about one-half the cylindrical diameter 16, or about one-half inch in the preferred case. This dimensioning of the mandrel 10 produces an angle between the plane of the flat surface 14 and a tangent 24 to a cylindrical surface 26 of about 60 degrees, as illustrated in FIG. 2. Each corner 22 between one of the flat surfaces 14 and the curved surface of the cylindrical piece 12 is made sharp (i.e., not bevelled or broken) but also free of burrs that might snag the optical fiber.

In practicing the invention, an optical fiber 28 is wound around the portion of the mandrel 10 having the flat surfaces 14 thereon. A simulated payout tension is applied to each of the free ends of the optical fiber 28, the tension typically being about 50 grams. At each corner 22, the optical fiber 28 is bent around the corner. In the preferred embodiment, the total bending angle is about 90 degrees at each corner 22. However, this total bending angle is equivalent to two symmetrical 30 and 60 degree simulated peel point bends. (The analysis of simulated peel point bends is discussed in greater detail in relation to FIGS. 5 and 6.) Since there are four corners 22, one turn of the optical fiber 28 around the portion of the mandrel 10 having the flat surfaces 14 results in four well-controlled and stable simulated peel point bends of 30 degrees each, and four well-controlled and stable simulated peel point bends of 60 degrees each. There are therefore eight simulated peel point bending locations per turn. In the illustration of FIG. 1, the optical fiber 28 is wound around the mandrel 10 twice, the two turns producing a total of eight simulated peel point bending locations of 30 degrees bending each and eight simulated peel point bending locations of 60 degrees bending each, for a total of sixteen simulated bending locations. Additional turns would produce eight more simulated bending locations per turn.

Figure 3:
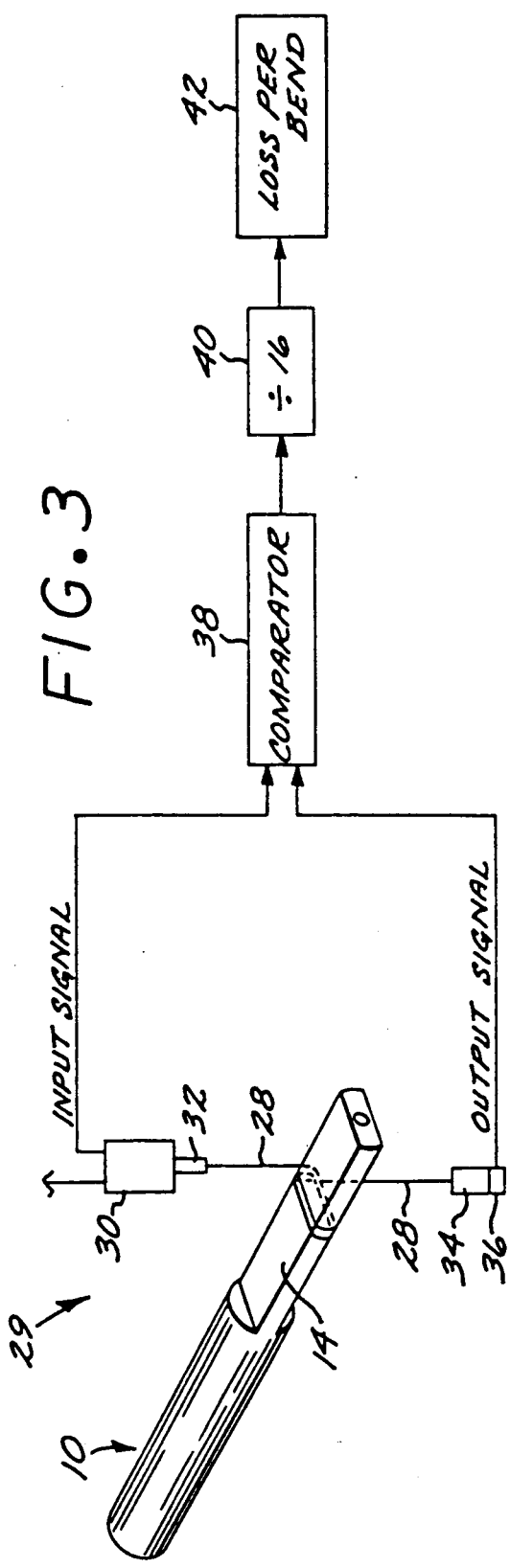
FIG. 3 is a schematic view of the apparatus for measuring peel point bending loss from an optical fiber.

The bending mandrel 10 just described is used to test optical properties of the optical fiber 28, using an apparatus 29 such as that illustrated in FIG. 3. At one free end of the optical fiber 28, a light source 30 of known intensity, such as a laser, directs light into the optical fiber 28 through an optical coupler 32. The light is transmitted through the optical fiber 28, including the simulated peel point bending locations, which number sixteen in the illustration of FIG. 3. Light leaves the other end of the optical fiber 28 through another optical coupler 34 and is detected by a detector 36. All of the components 30, 32, 34, and 36 are well known in the art. An alternative approach to introducing light into the optical fiber 28 and extracting light from the optical fiber 28 during the peel point bending test is transversely through the sides of the optical fiber when it is bent. This injection/extraction technique is well known in other contexts.

The input light intensity and the output light intensity are compared by a comparator 38, which calculates the light loss due to the sixteen simulated peel point bends. (Normally, the light loss due to losses in the apparatus and the unbent optical fiber is previously determined by conducting the measurement just described prior to the optical fiber being wound around the mandrel. The remaining light loss when the optical fiber is wound around the mandrel is due to the simulated peel point bends.) Since there are sixteen simulated bends in the illustrated embodiment, the loss determined in the comparator 38 is divided by 16 in an arithmetic divider 40, to yield an attenuation loss per bend, numeral 42. In a typical circumstance, the energy loss per peel point bend is about 0.1 db, which is difficult to measure accurately. With sixteen simulated bends, the total loss is about 1.6 db, which may be measured more easily and accurately.

The apparatus 29 can be used either for stationary measurements of the optical fiber 28 in the manner just described, or for moving measurements. In the latter case, the mandrel 10 is mounted in an apparatus such as will be discussed in relation to FIG. 7. In this approach, the optical fiber may be fed from a spool and taken up by a spool, and rotating optical couplers are used.

In accordance with another preferred embodiment of the invention, a process for testing an optical fiber comprises the steps of providing a bending mandrel formed with a portion thereof being an equilateral triangular prism; and winding an optical fiber around the equilateral triangular prism portion of the bending mandrel.

Figure 4:
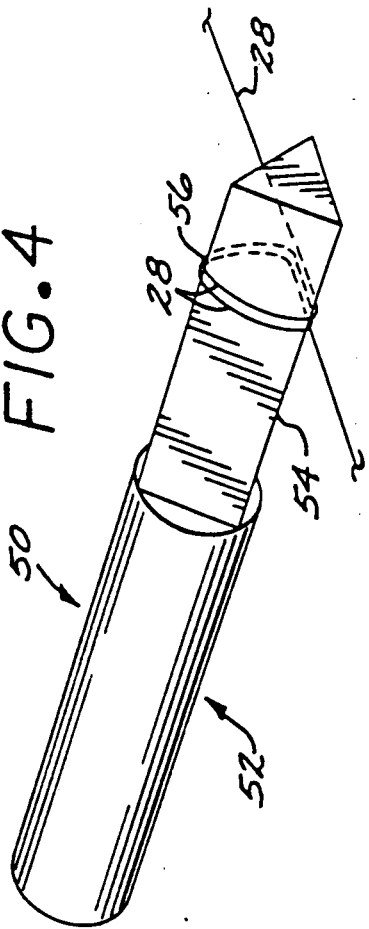
FIG. 4 is a perspective view of an equilateral triangular prism bending mandrel.
Figure 5:
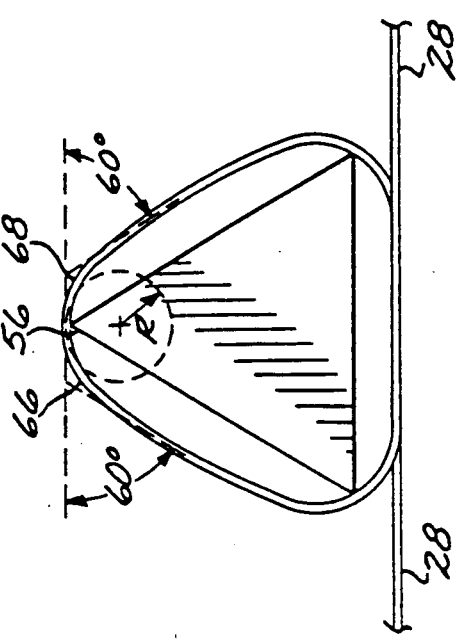
FIG. 5 is an end elevational view of the bending mandrel of FIG. 4.

FIGS. 4 and 5 illustrate such a triangular prism bending mandrel 50. The mandrel 50 includes a cylindrical portion 52 and a prism portion 54 that has the shape of an equilateral triangle when viewed in end view, FIG. 5. The optical fiber 28 is wound around the prism portion 54, with two turns being illustrated in FIG. 4. Each turn has six simulated peel point bends of 60 degrees each, two at each corner 56 of the prism portion 54. Two complete turns results in twelve simulated peel point bends, as compared with sixteen simulated peel point bends for the mandrel 10. Additional turns of the optical fiber 28 around the prism portion 54 can yield more simulated peel point bends, if such is required to obtain accurate results in subsequent measurements.

The total bending angle through which the optical fiber 28 is bent at each corner 56 is greater than for the case of the mandrel 10, and is 120 degrees as illustrated in FIG. 5. The bending produced by the mandrel 50 has the advantage of being precisely the same at each corner, in the sense that the optical fiber extends around the corner 56 from flat face to flat face. (In the mandrel 10 the optical fiber extends around the corner from flat face to curved face on two corners per turn of fiber, and from curved face to flat face at the other two corners per turn.)

The mandrel 50 is used in a measurement apparatus 29 identical to that illustrated in FIG. 3, except that an appropriate divider 40 is used (i.e., division by 12 in the case of two turns of optical fiber around a triangular mandrel).

Figure 6:
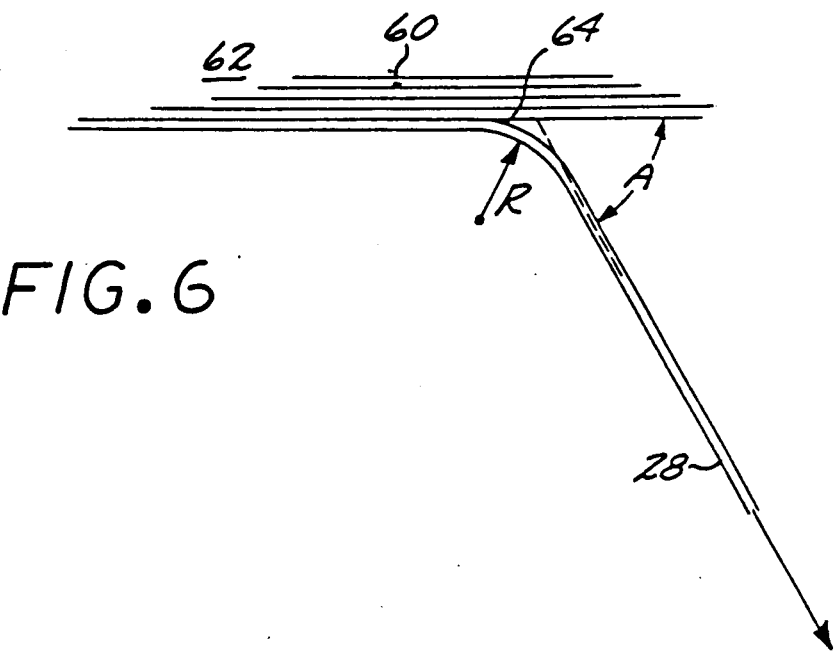
FIG. 6 is a schematic plan view of the peel point bending configuration of an optical fiber being paid out from a canister.

The mechanics of the bending of the optical fiber 28 over the mandrel 50 are illustrated in FIGS. 5 and 6. FIG. 6 is a schematic plan view illustration of the payout of the optical fiber 28 from a fiber pack 60 on a canister 62. The individual optical fiber 28 is separated from the fiber pack 60 at a peel point 64, which is typically a short length but can be idealized as a point of separation. The peel point bending angle A depends upon the geometry of the peel separation and the tension applied to the optical fiber 28. As indicated, the angle A is typically from about 30 to about 60 degrees, and normally is about 60 degrees. The radius of bending at the peel point is indicated as R, and is typically about 0.060 inches.

FIG. 5 illustrates how the triangular bending mandrel 60 simulates the bending conditions of FIG. 6, twice for each corner 56 and six times for each turn of the optical fiber 28 about the prism portion 54. As illustrated in FIG. 5 at the upwardly pointing corner 56, the optical fiber 28 is bent through a first 60 degree simulated peel point bend 66 from one flat face to the corner 56, and through a second 60 degree simulated peel point bend 68 from the corner 56 to the next flat face, for a total bending around the corner 54 of 120 degrees. The tension on the optical fiber 28 is selected to yield a bending radius R comparable to that experienced during the peeling operation of FIG. 7, or about 0.060 inches in the typical case. The combination of prism geometry and applied tension determines the bending radius of the mandrel 50. A one-inch face dimension and 50 grams of tension results in a bending radius of about 0.060 inches, through two simulated 60 degree peel point bends per corner, in the embodiment of FIG. 5. These dimensions and tensions can be varied as required to simulate various peeling conditions.

The present invention also extends to other configurations of the bending mandrel, and should not be viewed as being limited to the mandrel 10 and the mandrel 50. The mandrel may, for example, be made in the form of a square prism, or in other forms to provide other bending angles.

Figure 7:
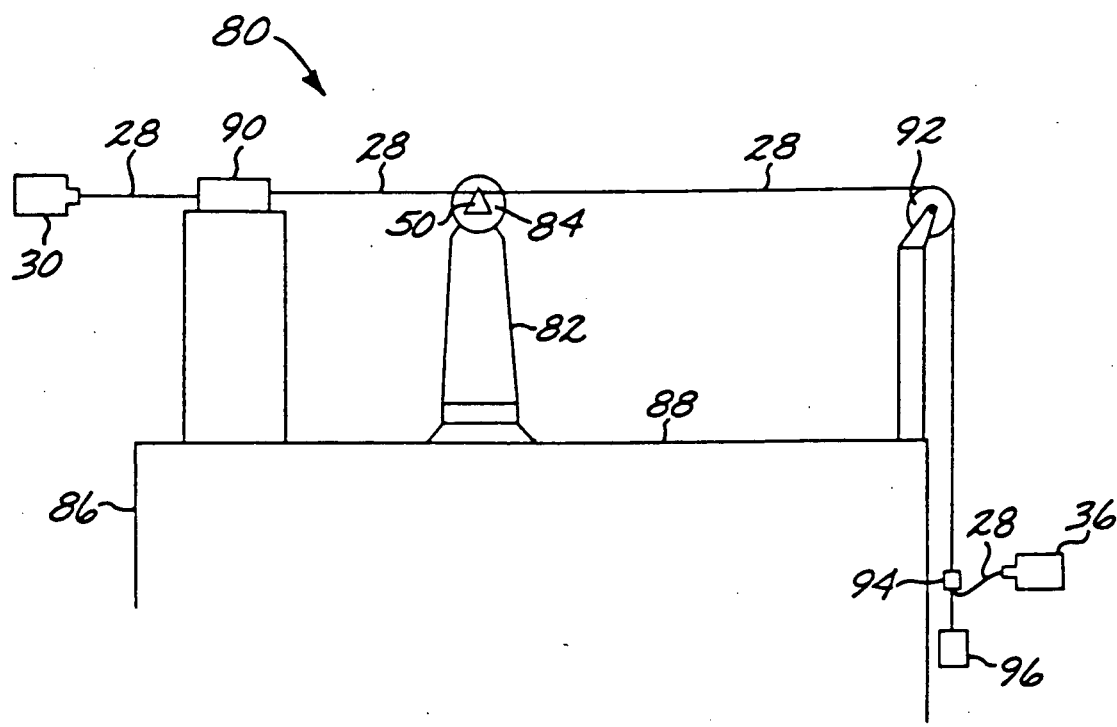
FIG. 7 is an elevational view of an apparatus for applying precisely controlled and distributed tension to an optical fiber wound around a bending mandrel.

Application of the proper tensioning to the optical fiber during the simulated peel point bending is important to achieve the proper bend geometry and for reproducibility. A tensioning apparatus 80 that produces such tensioning is illustrated in FIG. 7. The mandrel, here illustrated as the triangular prism mandrel 50, is mounted to a mandrel stand 82 by a rotational bearing 84, that permits the mandrel 50 to rotate freely about its prism axis. In the illustrated embodiment, the prism axis is in the horizontal plane. The mandrel stand 82 is mounted to a base 86 on a sliding track 88, which permits the mandrel stand 82, and thence the mandrel 50, to slide in the direction parallel to the lengths of the optical fiber 28 that extend from the mandrel 50.

The optical fiber 28 is secured near one end in a split rubber block 90 against longitudinal or transverse movement. Light is injected into the optical fiber 28 with the light source 30 discussed previously in relation to FIG. 3.

On the other side of the mandrel stand 82, the optical fiber 28 passes over a pulley 92 having a radius much larger than the radius R of curvature at the peel point. The optical fiber 28 extends downwardly from the pulley 92 to a rubber block 94 in which it is secured and thence to the detector 36. A weight 96 is hung from the rubber block 94, so that the total weight of the rubber block 94 and the weight 96 applies a tension to the optical fiber 28.

If the optical fiber 28 were simply wound around the mandrel and the tension applied, the optical fiber at various locations around the mandrel 50 would experience highly variable tensions. The tension can be equalized by moving the mandrel stand 82 back and forth along the track 88 while the tension is applied. Since the mandrel 50 freely rotates in the bearing 84, undue stress is not placed upon the optical fiber 28. The movement aids in ensuring that the tension applied to the optical fiber 28 at the various corners 56 around the mandrel become substantially equal to the tension produced by the total force of the weight 96 and the rubber block 94. This tensioning apparatus 80 also permits the measurement of the light loss at a range of locations along the length of the optical fiber 28.

The tensioning apparatus 80 is preferably used in conjunction with the light measurement apparatus 29 and circuitry illustrated in FIG. 3.

The present invention provides an approach for measuring peel point bending losses of an optical fiber accurately. Although particular embodiments of the invention have been described in detail for purposes of illustration, various modifications may be made without departing from the spirit and scope of the invention. Accordingly, the invention is not to be limited except as by the appended claims.

What is claimed is:

1. A process for testing an optical fiber, comprising the steps of:
   providing a bending mandrel having a longitudinal axis and at least one substantially flat surface formed on said mandrel and lying in a plane parallel to said longitudinal axis to provide at least two simulated peel point bending locations disposed such that an optical fiber wound around the mandrel passes over the bending locations, each peel point bending location bending the optical fiber in a manner simulating the bending that an optical fiber undergoes when payed out from a fiber canister; and
   winding the optical fiber over the bending mandrel, thereby simultaneously applying multiple simulated peel point bends to the length of the optical fiber in contact with the mandrel.

2. The process of claim 1, wherein the bending mandrel is a cylindrical rod having opposing flat surfaces symmetrically formed therein, each flat surface lying in a plane parallel to said longitudinal axis.

3. The process of claim 1, wherein the bending mandrel has three flat surfaces forming an equilateral triangular prism.

4. The process of claim 1, wherein the optical fiber is bent through a total angle of from about 60 degrees to about 120 degrees at each of the bending locations.

5. The process of claim 1, further including the additional step of
   applying a tension to the optical fiber while it is wound over the bending mandrel.

6. The process of claim 5, further including the additional step of
   ensuring that the tension is applied substantially equally at each of the bending locations.

7. The process of claim 1, further including the additional step of
   measuring the transmission of light through the optical fiber while it is wound over the bending mandrel.

8. A process for testing an optical fiber, comprising the steps of:
   providing a bending mandrel formed from a cylinder having two flat surfaces therein perpendicular to a cylindrical diameter; and
   winding an optical fiber around the bending mandrel.

9. The process of claim 8, wherein the optical fiber is wound around the bending mandrel at least twice.

10. The process of claim 8, wherein tension is applied to the optical fiber while it is wound around the mandrel.

11. The process of claim 8, wherein the spacing between the flat surfaces is about one-half the diameter of the cylinder.

12. The process of claim 8, wherein the cylindrical diameter of the mandrel is about 1 inch.

13. The process of claim 8, further including the additional step of
   measuring the transmission of light through the optical fiber while it is wound over the optical fiber.

14. A process for testing an optical fiber, comprising the steps of:
   providing a bending mandrel formed with a portion thereof being an equilateral triangular prism; and
   winding an optical fiber around the equilateral triangular prism portion of the bending mandrel.

15. The process of claim 14, wherein the optical fiber is wound around the bending mandrel at least twice.

16. The process of claim 14, wherein tension is applied to the optical fiber while it is wound around the mandrel.

17. The process of claim 14, further including the additional step of
   measuring the transmission of light through the optical fiber while it is wound over the optical fiber.

18. Apparatus for testing optical transmission of an optical fiber, comprising:
   a bending mandrel having a longitudinal axis and at least one substantially flat surface formed on said mandrel and lying in a plane substantially parallel to said longitudinal axis to provide at least two simulated peel point bending locations thereon; and
   means for sending a beam of light through a length of an optical fiber wound over the bending mandrel, for receiving that portion of the beam of light transmitted through the length of the optical fiber wound over the bending mandrel, and for comparing the intensities of the light received and the light sent.

19. The apparatus of claim 18, further including:
   means for applying a tension to the optical fiber wound over the bending mandrel.

20. The apparatus of claim 18, further including:
   means for manipulating the optical fiber wound over the mandrel to ensure that the tension in the optical fiber at all simulated peel point bending locations is substantially the same.

21. The apparatus of claim 18, wherein the bending mandrel is mounted on a support that permits the mandrel to rotate about its axis.

* * * * *